(12) United States Patent
Hua et al.

(10) Patent No.: US 8,712,109 B2
(45) Date of Patent: Apr. 29, 2014

(54) POSE-VARIANT FACE RECOGNITION USING MULTISCALE LOCAL DESCRIPTORS

(75) Inventors: Gang Hua, Kirkland, WA (US); John Wright, Chesterfield, MO (US); Amir Akbarzadeh, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 674 days.

(21) Appl. No.: 12/437,561

(22) Filed: May 8, 2009

(65) Prior Publication Data

US 2010/0284577 A1 Nov. 11, 2010

(51) Int. Cl.
*G06K 9/00* (2006.01)

(52) U.S. Cl.
USPC ............................................. 382/118

(58) Field of Classification Search
None
See application file for complete search history.

(56) References Cited

U.S. PATENT DOCUMENTS

| | | | |
|---|---|---|---|
| 5,210,820 A * | 5/1993 | Kenyon ........................ | 704/200 |
| 6,466,692 B1 | 10/2002 | Washizawa | |
| 6,763,148 B1 * | 7/2004 | Sternberg et al. ............. | 382/293 |
| 6,879,709 B2 | 4/2005 | Tian et al. | |
| 6,937,773 B1 | 8/2005 | Nozawa et al. | |
| 7,356,190 B2 | 4/2008 | Mizoguchi et al. | |
| 2003/0063795 A1 * | 4/2003 | Trajkovic et al. ............. | 382/159 |
| 2006/0123241 A1 * | 6/2006 | Martinian et al. ............. | 713/186 |
| 2006/0253491 A1 * | 11/2006 | Gokturk et al. ............ | 707/104.1 |
| 2008/0091627 A1 | 4/2008 | Hosoi et al. | |
| 2008/0212899 A1 | 9/2008 | Gokturk et al. | |
| 2008/0215513 A1 * | 9/2008 | Weston et al. .................. | 706/13 |
| 2009/0196464 A1 * | 8/2009 | Dimitrova et al. ............ | 382/118 |
| 2010/0195872 A1 * | 8/2010 | Velardo et al. ................ | 382/106 |

FOREIGN PATENT DOCUMENTS

WO 2008130907 A1 10/2008

OTHER PUBLICATIONS

Amit, et al., "Efficient Focusing and Face Detection", Technical Report No. 459, Retrieved at <<http://citeseerx.ist.psu.edu/viewdoc/download;jsessionid=36C3342C0D9EF6FD90F33509CF70A839?doi=10.1.1.54.6621&rep=rep1&type=pdf>>, Oct. 1997, pp. 1-16.
Amit, et al., "Shape Quantization and Recognition with Randomized Trees", Retrieved at <<http://citeseerx.ist.psu.edu/viewdoc/download?doi=10.1.1.57.6069&rep=rep1&type=pdf>>, Aug. 1996, pp. 1-56.
Neemuchwala, et al., "Feature Coincidence Trees for Registration of Ultrasound Breast Images", Proceedings of IEEE International Conference on Image Processing, Retrieved at <<http://www.sycl.ucsd.edu/~nuno/ICIP01/Heroeral.pdf>>, Oct. 2001, pp. 10-13.
Baraniuk, et al., "Random Projections of Smooth Manifolds", Retrieved at <<http://people.ee.duke.edu/~lcarin/Baraniuk3.pdf>>, Oct. 2006, pp. 1-23.

(Continued)

*Primary Examiner* — Jason M Repko
*Assistant Examiner* — Jhere Rowland
(74) *Attorney, Agent, or Firm* — Steven Spellman; Jim Ross; Micky Minhas (57) ABSTRACT

Representing a face by jointly quantizing features and spatial location to perform implicit elastic matching between features. A plurality of the features are extracted from a face image and expanded with a corresponding spatial location in the face image. Each of the expanded features is quantized based on one or more randomized decision trees. A histogram of the quantized features is calculated to represent the face image. The histogram is compared to histograms of other face images to identify a match, or to calculate a distance metric representative of a difference between faces.

20 Claims, 5 Drawing Sheets

(56) References Cited

OTHER PUBLICATIONS

Belhumeur, et al., "Eigenfaces vs. Fisherfaces: Recognition using Class Specific Linear Projection", IEEE Transactions on Pattern Analysis and Machine Intelligence, Retrieved at << http://ieeexplore.ieee.org/Xplore/Confirm.jsp?url=/eil1/34/13123/00598228.pdf?temp=x&htry=2u>>, vol. 19, No. 7, Jul. 1997, pp. 711-720.

Blanz, et al., "Face Recognition based on Fitting a 3D Morphable Model", IEEE Transactions on Pattern Analysis and Machine Intelligence, Retrieved at <<http://gravis.cs.unibas.ch/publications/pami03.pdf>>, vol. 25, No. 9, Sep. 2003, pp. 1-12.

Cai, et al., "Orthogonal Laplacianfaces for Recognition", IEEE Transactions on Image Processing, Retrieved at <<http://www.cs.uiuc.edu/homes/dengcai2/Publication/Journal/TIP-OLPP.pdf>>, vol. 15, No. 11, Nov. 2006, pp. 1-19.

Cootes, et al., "Active Appearance Models", IEEE Transactions on Pattern Analysis and Machine Intelligence, Retrieved at <<http://ieeexplore.ieee.org/stamp/stamp.jsp?arnumber=00927467>>, vol. 23, No. 6, Jun. 2001, pp. 681-685.

Dasgupta, et al., "Random Projection Trees and Low Dimensional Manifolds", Technical Report CS2007-0890, Department of Computer Science and Engineering, University of California, Retrieved at <<http://www.cs.ucsd.edu/~dasgupta/papers/rptree-tr.pdf>>, 2007, pp. 1-29.

Freund, et al., "Learning the Structure of Manifolds using Random Projections", Advances in Neural Information Processing Systems, Retrieved at <<http://books.nips.cc/papers/files/nips20/NIPS2007_0133.pdf>>, vol. 20, 2007, pp. 1-8.

Georghiades, et al., "From Few to Many: Illumination Cone Models for Face Recognition under Variable Lighting and Pose", IEEE Transactions on Pattern Analysis and Machine Intelligence, Retrieved at <<http://vision.ucsd.edu/kriegman-grp/papers/pami01.pdf>>, vol. 23, No. 6, Jun. 2001, pp. 1-35.

Gross, et al., "Generic vs. Person Specific Active Appearance Models", Image and Vision Computing, Retrieved at <<http://citeseerx.ist.psu.edu/viewdoc/summary?doi=10.1.1.58.3137>>, vol. 23, No. 11, Nov. 2005, pp. 10.

Gross, et al., "Multi-PIE", Proceedings of the IEEE International Conference on Automatic Face and Gesture Recognition, Retrieved at <<http://research.microsoft.com/pubs/69512/multipie-fg-08.pdf>>, Sep. 17-19, 2008, pp. 1-8.

He, et al., "Face Recognition using Laplacianfaces", IEEE Transactions on Pattern Analysis and Machine Intelligence, Retrieved at <<http://ieeexplore.ieee.org/stamp/stamp.jsp?arnumber=01388260>>, vol. 27, No. 3, Mar. 2005, pp. 328-340.

Hua, et al., "Face Recognition using Discriminatively Trained Orthogonal Rank One Tensor Projections", IEEE Conference on Computer Vision and Pattern Recognition, Retrieved at <<http://ieeexplore.ieee.org/stamp/stamp.jsp?arnumber=4270132&isnumber=4269956>>, Jun. 17-22, 2007, pp. 1-8.

Huang, et al., "Labeled Faces in the Wild: A Database for Studying Face Recognition in Unconstrained Environments", Technical Report 07-49, University of Massachusetts, Retrieved at <<http://www.tamaraberg.com/papers/Huang_eccv2008-Ifw.pdf>>, 2007, pp. 1-14.

Lepetit, et al., "Keypoint Recognition Using Randomized Trees", IEEE Transactions on Pattern Analysis and Machine Intelligence, Retrieved at <<http://ieeexplore.ieee.org/stamp/stamp.jsp?arnumber=1661548&isnumber=34764>>, vol. 28, No. 9, Sep. 2006, pp. 1465-1479.

Lowe, David G., "Distinctive Image Features from Scale-Invariant Keypoints", International Journal of Computer Vision, Retrieved at <<http://www.cs.ubc.ca/~lowe/papers/ijcv04.pdf>>, Jan. 5, 2004, pp. 1-28.

Luo, et al., "Person-Specific SIFT Features for Face Recognition", IEEE International Conference on Acoustics, Speech and Signal Processing, Retrieved at <<http://ieeexplore.ieee.org/stamp/stamp.jsp?arnumbr=4217478&isnumber=421719>>, Apr. 15-20, 2007, pp. 1-4.

Moosmann, et al., "Fast Discriminative Visual Codebooks Using Randomized Clustering Forests", Advances in Neural Information Processing Systems, Retrieved at <<http://eprints.pascal-network.org/archive/00002438/01/nips.pdf>>, No. 19, 2006, pp. 1-7.

Nister, et al., "Scalable Recognition with a Vocabulary Tree", in IEEE Conference on Computer Vision and Pattern Recognition, Retrieved at <<http://www.vis.uky.edu/~stewe/publications/nister_stewenius_cvpr2006.pdf>>, vol. 2, Jun. 2006, pp. 8.

Nowak, et al., "Learning Visual Similarity Measures for Comparing Never Seen Objects", IEEE Conference on Computer Vision & Pattern Recognition, Retrieved at <<http://lear.inrialpes.fr/people/nowak/dwl/cvpr07.pdf>>, Jun. 2007, pp. 1-8.

Samaria, et al., "Parameterization of a Stochastic Model for Human Face Identification", IEEE Workshop on Proceedings of the Second, Retrieved at <<http://ieeexplore.ieee.org/stamp/stamp.jsp?arnumber=00341300>>, Dec. 5-7, 1994, pp. 138-142.

Silpa-Anan, et al., "Optimised KD-Trees for Fast Image Descriptor Matching", IEEE Conference on Computer Vision and Pattern Recognition, Retrieved at <<http://ieeexplore.ieee.org/stamp/stamp.jsp?arnumber=4587638&isnumber=4587335>>, Jun. 23-28, 2008, pp. 8.

Sim, et al., "The CMU Pose, Illumination and Expression Database", Retrieved at <<http://ieeexplore.ieee.org/stamp/stamp.jsp?arnumber=01251154>>, vol. 25, No. 12, Dec. 2003, pp. 1615-1618.

Tola, et al., "A Fast Local Descriptor for Dense Matching", IEEE Conference on Computer Vision and Pattern Recognition, Retrieved at <<http://cvlab.epfl.ch/publications/publications/2008/TolaLF08.pdf>>, Jun. 23-28, 2008, pp. 1-8.

Turk, et al., "Eigenfaces for Recognition", Journal of Cognitive Neuroscience, Retrieved at <<http://www.cs.cornell.edu/Courses/cs322/2007sp/slides/pca-figs.pdf>>, vol. 3, No. 1, 1991, pp. 16.

Viola, et al., "Robust Real-Time Face Detection", International Journal of Computer Vision, Retrieved at <<http://lear.inrialpes.fr/people/triggs/student/vj/viola-ijcv04.pdf>>, vol. 57, No. 2, 2004, pp. 137-154.

Wang, et al., "Generalized Quotient Image", In Proceedings of IEEE Computer Vision and Pattern Recogniton, Retrieved at <<http://ieeexplore.ieee.org/stamp/stamp.jsp?arnumbe=1315205&isnumber=29134>>, 2004, pp. 8.

Winder, et al., "Learning Local Image Descriptors", IEEE Conference on Computer Vision and Pattern Recognition, Retrieved at <<http://ieeexplore.ieee.org/stamp/stamp.jsp?arnumber=4269996&isnumber=4269956>>, Jun. 17-22, 2007, pp. 8.

Wiskott, et al., "Face Recognition by Elastic Bunch Graph Matching", in Intelligent Biometric Techniques in Fingerprint and Face Recognition, IEEE Transactions on Pattern Analysis and Machine Intelligence, Retrieved at <<http://www.face-rec.org/algorithms/EBGM/WisFelKrue99-FaceRecognition-JainBook.pdf>>, vol. 19, 1999, pp. 1-23.

Wolf, et al., "Descriptor Based Methods in the Wild", Post ECCV workshop on Faces in Real-Life Images: Detection, Alignment, and Recognition, Retrieved at <<http://hal.archives-ouvertes.fr/docs/00/32/67/29/PDF/Wolf_patchlbp.pdf>>, 2008, pp. 1-14.

Yang, et al., "Unifying Discriminative Visual Codebook Generation with Classifier Training for Object Category Recognition", IEEE Conference on Computer Vision and Pattern Recognition, Retrieved at <<http://www.cs.cmu.edu/~rahuls/pub/cvpr2008-unified-rahuls.pdf>>, Jun. 23-28, 2008, pp. 8.

* cited by examiner

POSE-VARIANT FACE RECOGNITION USING MULTISCALE LOCAL DESCRIPTORS

BACKGROUND

Cameras and other photographic equipment produce digital images of landscapes, people, objects, and the like. Typically, a person identifies the content within each of the images, or compares the images to identify similarities or differences. Computerized systems perform edge detection or other techniques to automatically outline shapes within the images. Some of these computerized systems specifically outline faces within the images. The outlined faces are compared to images of known faces to identify the outlined faces. This comparison is referred to as face recognition. Face recognition is useful in, for example, traditional security and surveillance scenarios as well as in emerging online scenarios such as image tagging and image search. Existing face recognition algorithms, however, assume that the face images are very well aligned. This assumption is proven incorrect in real-life face recognition tasks, in which face detection and rectification have to be performed automatically prior to recognition. As such, the existing systems fail when attempting to perform face recognition on face images having significant pose variations.

SUMMARY

Embodiments of the disclosure provide a representation of an image of a face for pose-variant face recognition. A plurality of features is extracted from the image of the face. Each of the extracted features is expanded with a location corresponding thereto in the image. Each of the expanded features is quantized based on one or more randomized decision trees to enable implicit matching between one or more of the features. A histogram of the quantized features is calculated. The histogram represents the accessed image. In some embodiments, the histogram is compared to histograms of other faces to identify a match.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Referring to the figures, embodiments of the disclosure provide, at least, robust pose-variant face recognition across different datasets due at least to weak dependence on data. Aspects of the disclosure recognize misaligned faces by extracting a set of high-dimensional, discriminative, and near-invariant features from an image to perform an implicit (e.g., "soft") matching. The implicit matching occurs by jointly quantizing feature values and the spatial locations (e.g., coordinates) from which the features were extracted. A quantizer includes a forest of randomized decision or projection trees in which each node acts on a random projection of the data. Because the trees are only weakly data-dependent, the trees exhibit great generalization ability across different datasets (e.g., apply to new face datasets without strong, supervised learning).

While embodiments of the disclosure are described with reference to example image sizes, weightings, formulas, and the like, aspects of the disclosure are operable with other different parameters, some of which are not explicitly described herein but still within the scope of the disclosure.

Referring again to FIG. 1, an exemplary block diagram illustrates a computing device 104 storing images 110 and corresponding histograms 114. The computing device 104 includes at least a processor 108 and a memory area 106. The processor 108 includes any quantity of processing units, and is programmed to execute computer-executable instructions for implementing aspects of the disclosure. The instructions may be performed by the processor 108 or by multiple processors executing within the computing device 104, or performed by a processor external to the computing device 104. In some embodiments, the processor 108 is programmed to execute instructions such as those illustrated in the figures (e.g., FIG. 2).

Figure 1:
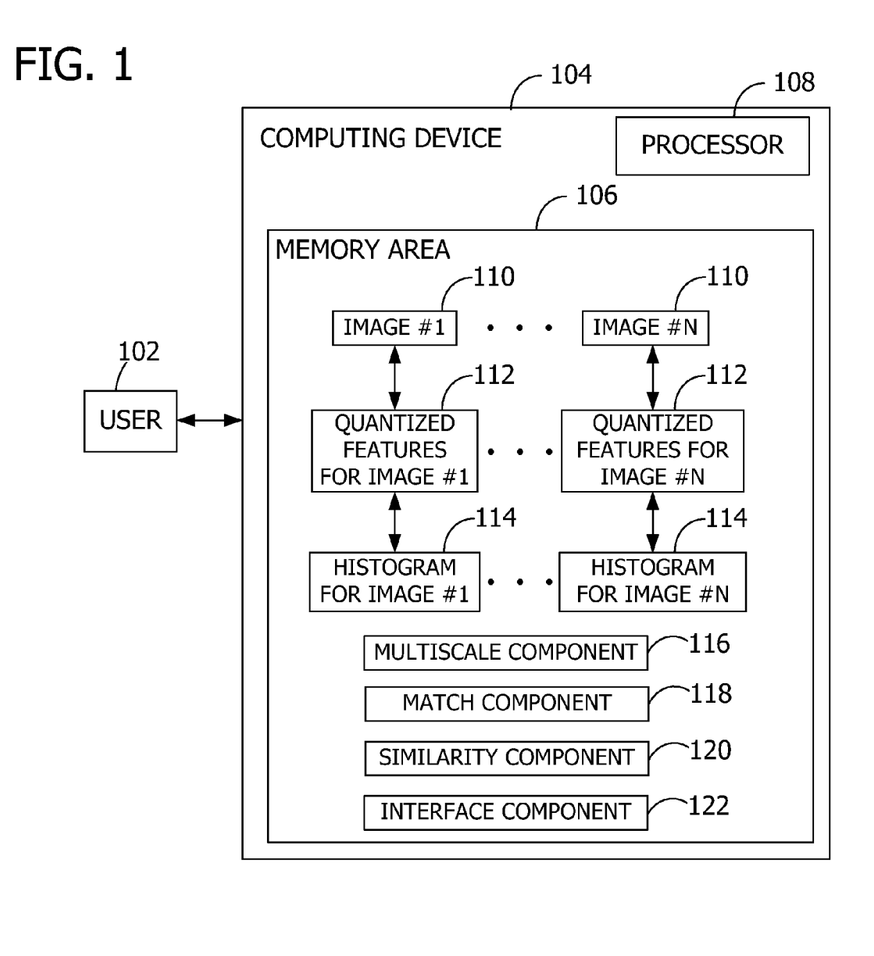
FIG. 1 is an exemplary block diagram illustrating a computing device storing images and corresponding histograms.

The memory area 106, or other computer-readable media, stores the images 110 such as image #1 through image #N. Each of the images 110 has quantized features 112 associated therewith, such as quantized features for image #1 through quantized features for image #N. Each of the sets of quantized features 112 may also be represented by the histogram 114, such as histogram for image #1 through histogram for image #N. In some embodiments, the quantized features are represented as vectors.

In general, the memory area 106 is associated with the computing device 104. For example, in FIG. 1, the memory area 106 is within the computing device 104. However, the memory area 106 or any of the data stored thereon may be associated with any server or other computer, local or remote from the computing device 104 (e.g., accessible via a network). For example, the memory area 106 may be associated with any of a plurality of computing devices in a cloud computing embodiment.

The computer-readable medium, such as memory area 106, further stores computer-executable components for implementing aspects of the disclosure. Exemplary components include a multiscale component 116, a match component 118, a similarity component 120, and an interface component 122. The multiscale component 116 creates a set of feature patches from the image of a face (e.g., one face per image). The multiscale component 116 further extracts a plurality of feature descriptors at a pre-defined pixel interval from the created set of feature patches. The match component 118 expands each of the features extracted by the multiscale component 116 with a location corresponding thereto in the image 110. The match component 118 further quantizes each of the expanded features based on one or more randomized decision trees.

The similarity component 120 defines a distance metric which compares the quantized features 112 corresponding to the image 110 with quantized features 112 corresponding to at least one other image (e.g., previously stored) to generate a distance. The distance metric represents a difference between the images. For example, the distance metric may be calculated with respect to a plurality of other images to identify similar faces, where there is one face per image. The interface component 122 provides, to a user 102 of the computing device 104, data corresponding to the distance metric generated by the similarity component 120. In some embodiments, the similarity component 120 calculates a confidence score based on the distance metric and the interface component 122 provides the confidence score to the user 102. For example, the similarity component 120 weights the difference between the images based on discriminative features (e.g., using a term frequency-inverse document frequency weighting norm).

Figure 2:
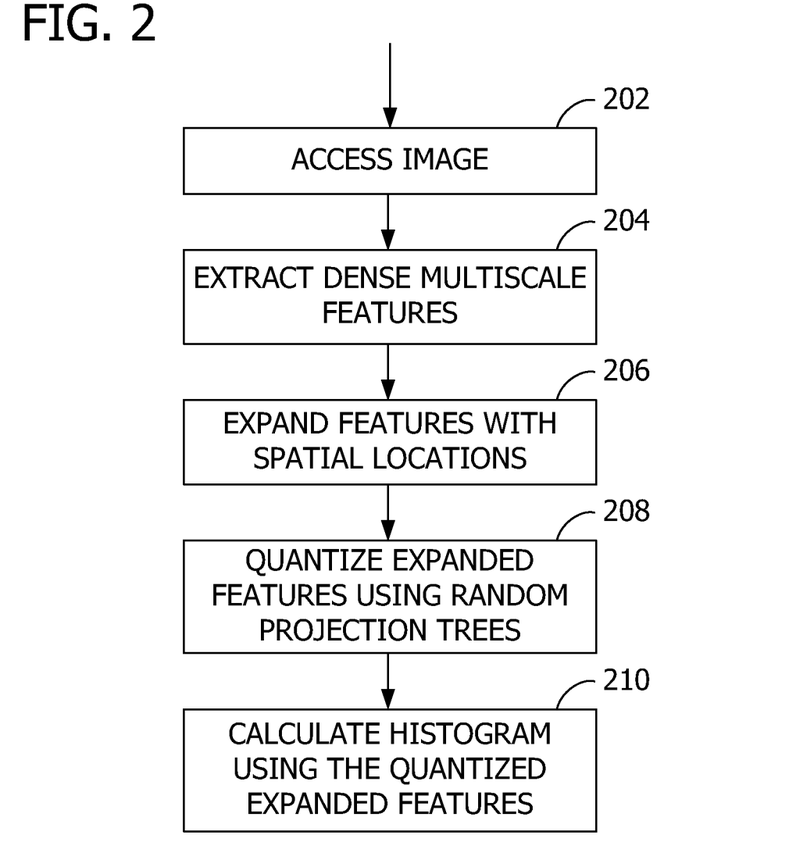
FIG. 2 is an exemplary flow chart illustrating the creation of a histogram of features corresponding to a face image.

Referring next to FIG. 2, an exemplary flow chart illustrates the creation of the histogram 114 of features 112 corresponding to the image of a face. The image, such as image 110, is accessed at 202, and a face is detected within the accessed image 110. Eyes are detected within the face. Geometric rectification, or other means for mapping coordinates to a grid or performing a transformation between coordinate systems, is performed to map the detected locations to canonical locations. Illumination compensation is performed on the geometrically rectified image to normalize the lighting as will be discussed below with reference to FIG. 3.

Dense multiscale features are extracted from the rectified and compensated image at 204. The features are high dimensional and near invariant. By extracting dense features, most features in the image 110 have an approximate match in the corresponding gallery image without having to rely on keypoint detection. For example, a plurality of patches is generated from the image 110 by performing dense sampling of the image 110 at a pre-defined pixel interval. Vectors corresponding to features of the image 110 are generated. In some embodiments, the feature dimension is 400. The extracted features (e.g., as represented by the vectors) are expanded at 206 with their corresponding spatial locations within the image 110. For example, the pixel coordinates from the patches are concatenated onto the features.

Randomized projection trees are generated. Using the randomized projection trees, the extracted features are quantized at 208 to enable implicit matching between one or more of the features (e.g., smooth region boundaries). The histogram 114 is calculated at 210 using the quantized expanded features 112. The calculated histogram 114 is stored in, for example, the memory area 106 and associated with the image 110 corresponding thereto. In some embodiments, the histogram 114 is compared to other histograms 114 stored in the memory area 106 to identify similarities or differences between the image 110 and other images.

In some embodiments, spatially adjacent feature locations are combined to reduce computational effort.

Figure 3:
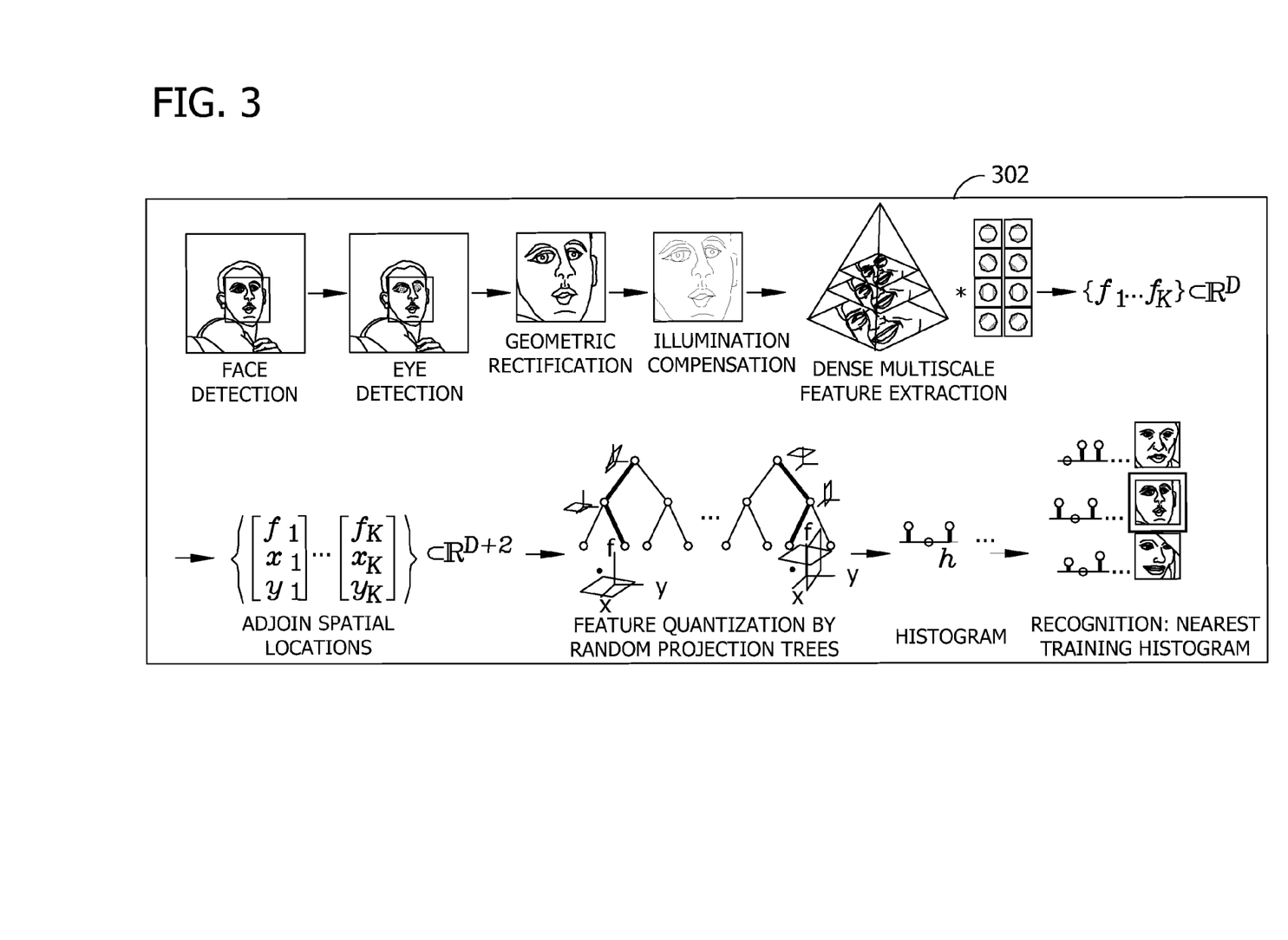
FIG. 3 is an exemplary block diagram illustrating an example system for image recognition.

Referring next to FIG. 3, an exemplary block diagram illustrates an example system for face recognition. The system 302 takes as input the image 110 containing a human face, and applies a standard face detector. Eye detection is performed based on the approximate bounding box provided by the face detector. In some embodiments, the eye detector is a neural network-based regressor whose input is the detected face patches. Geometric rectification is performed, in some embodiments, by finding a similarity transformation that maps the detected eyes to a pair of canonical locations. A photometric rectification step that uses the self-quotient image is performed to eliminate smooth variations due to illumination. The resulting face image after geometric and photometric rectification has size 32 pixels×32 pixels. From this small image, an overcomplete set of high-dimensional near-invariant features is extracted (e.g., by the multiscale component 116), computed at dense locations in image space and scale. In some embodiments, the feature set is overcomplete in that the quantity of extracted features exceeds the dimensionality of the input image.

These features are augmented with their locations in the image patch (e.g., by the match component 118) and are fed into a quantizer based on a set of randomized decision trees. The final representation of the face is the sparse histogram 114 of the quantized features 112. An inverse document frequency (IDF) weighted $l^1$ norm is adopted as the final distance metric for the task of recognition (e.g., by the similarity component 120). In some embodiments, the system 302 is implemented in C++.

Figure 4:
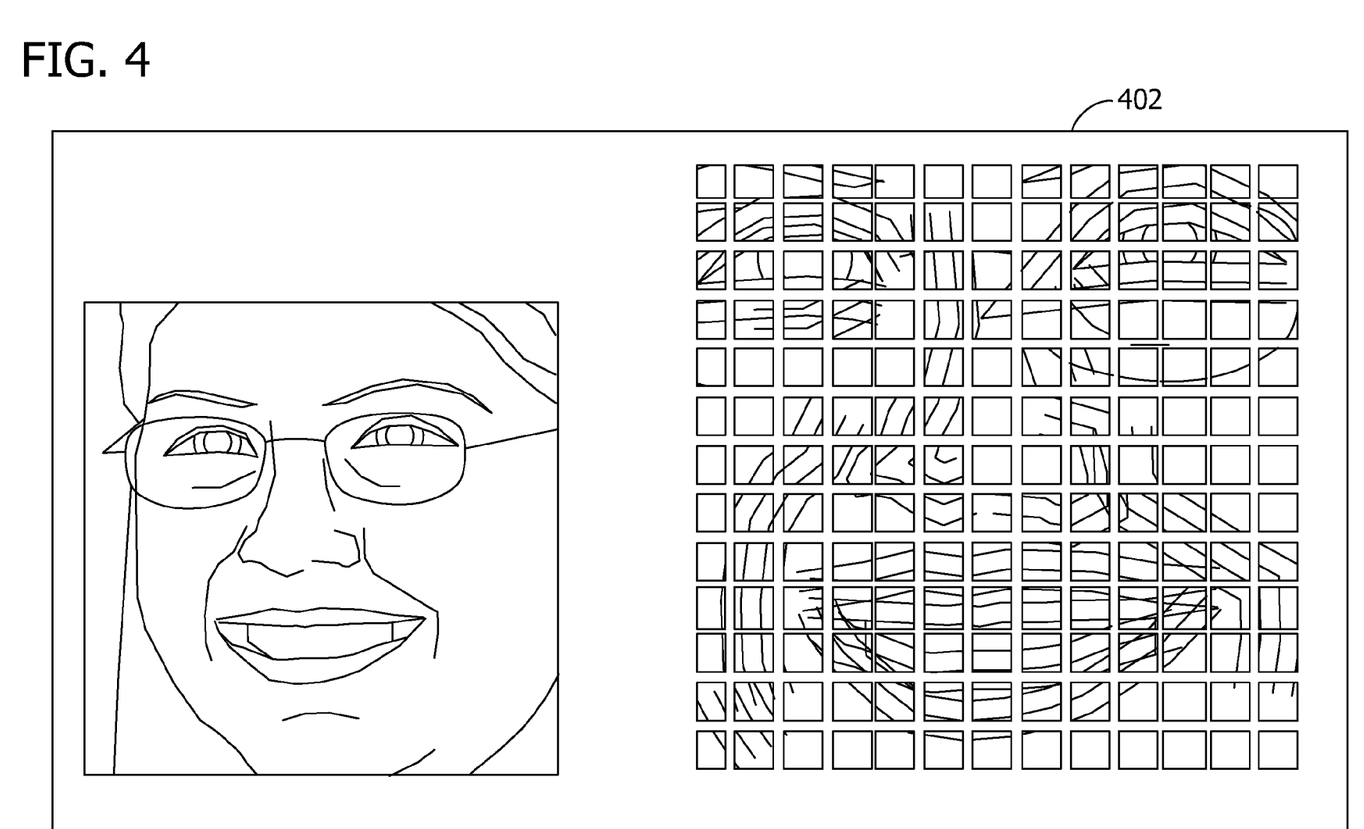
FIG. 4 is an exemplary block diagram illustrating feature patches of an image.

Referring next to FIG. 4, an exemplary block diagram illustrates the relationship 402 between features patches and an image. The features patches shown are those extracted from the example image. In some embodiments, a Gaussian pyramid of images (e.g., properly rectified and illumination-normalized) of size 32×32, 31×31, and 30×30 are formed. Within each of these images, feature descriptors are computed at intervals of two pixels. The descriptors are computed from 8×8 patches upsampled to 64×64. The set of feature patches for a given input face image are shown in FIG. 4. A feature descriptor $f \in \Re^d$ is computed for each patch. In an example, a D=400-dimensional feature descriptor is used. This descriptor aggregates responses to quadrature pairs of steerable fourth-order Gaussian derivatives. The responses to the two quadrature filters are binned by parity and sign (e.g., even-positive, etc.), giving four responses (two of which are nonzero) at each pixel. Four steering directions are used, for a total of 16 dimensions at each pixel. These 16-dimensional responses are aggregated spatially in a Gaussian-weighted log-polar arrangement of 25 bins for an overall feature vector dimension of 400. To incorporate loose spatial information into the subsequent feature quantization process, the pixel coordinates of the center of the patch are concatenated onto the corresponding feature descriptor for a combined feature dimension of 402.

In some embodiments, scale information is not included in the feature extraction to ensure that the process is as invariant as possible to local scalings. The quantity of feature vectors extracted from each image is 457 in some embodiments, which represents a highly overcomplete representation of the fairly small (32×32) detection output. As such, the process allows for simple decision architectures such as linear separators or random linear separators to perform accurately. In some embodiments, the computational effort is reduced by exploiting overlap between spatially adjacent feature locations.

Figure 5:
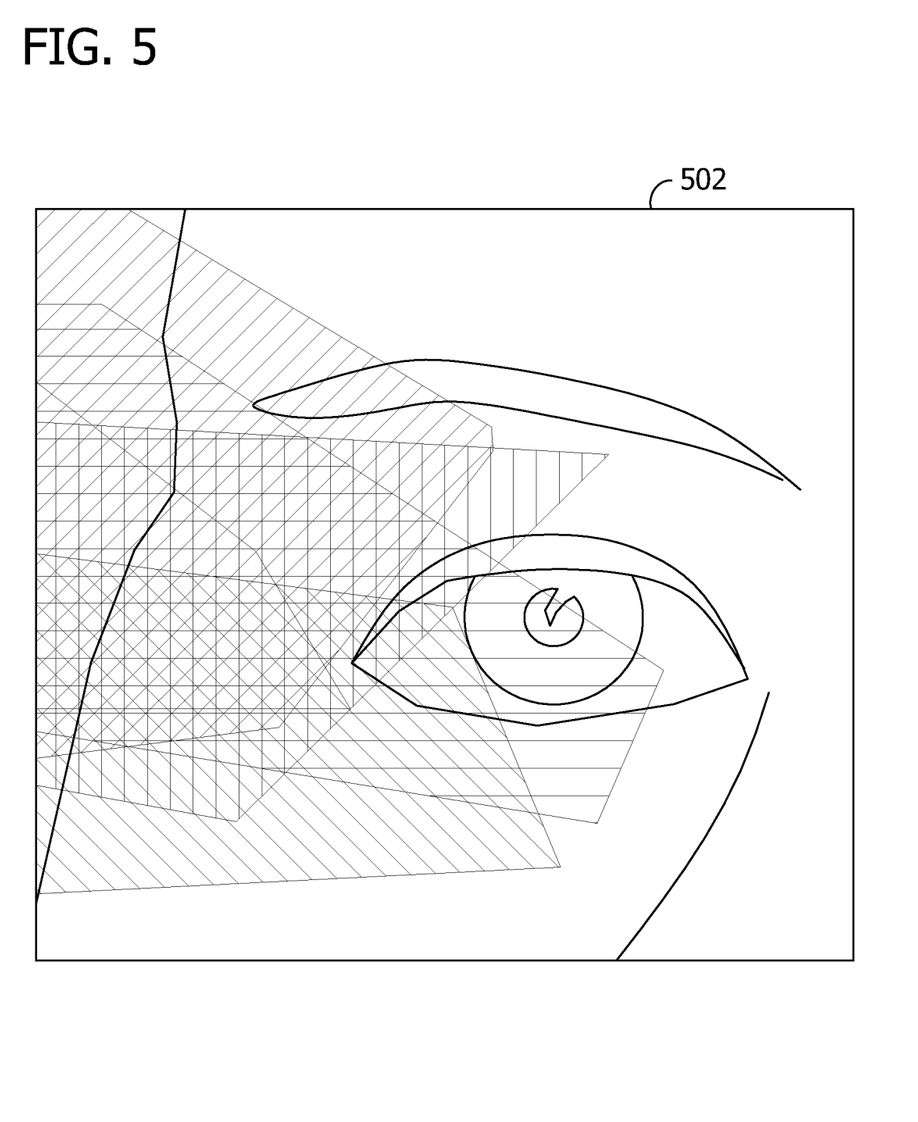
FIG. 5 is an exemplary block diagram illustrating joint feature-spatial quantization.

Referring next to FIG. 5, an exemplary block diagram illustrates an example of joint feature-spatial quantization. The quantization regions visualized in FIG. 5 are the output of the quantization operations (e.g., operation 208 in FIG. 2). In some embodiments, the training phase begins with the set of augmented features extracted from a set of training face images such as images 110. A forest of randomized trees $T_1 \ldots T_k$ is induced, such as described in Appendix A. Each tree is generated independently and each has a fixed maximum depth h. At each node v of the tree, a random vector $w_v \in \mathbb{R}^{D+2}$ and a threshold such as shown in Equation (1) below are generated.

$$\tau_v = \text{median}\{\langle w_v, \tilde{f} \rangle | \tilde{f} \in X\} \qquad (1)$$

The random vector and threshold correspond to the binary decision rule as shown in Equation (2) below.

$$\langle w_v, \cdot \rangle \gtrless \tau_v \qquad (2)$$

The training procedure then recurses on the left and right subsets $X_L \doteq \{\tilde{f} | \langle w_v, \tilde{f} \rangle \le \tau_v\}$ and $X_R \doteq \{\tilde{f} | \langle w_v, \tilde{f} \rangle > \tau_v\}$. The random projection $w_v$ is sampled from an anisotropic Gaussian as shown in Equation (3) below.

$$w_v \sim \mathcal{N}\left(0, \begin{bmatrix} \sigma_f^{-2} I_{D \times D} & \\ & \sigma_x^{-2} I_{2 \times 2} \end{bmatrix}\right) \quad (3)$$

where $$\sigma_f^2 = \mathrm{trace}\,\hat{\Sigma}(f) \text{ and } \sigma_x = \mathrm{trace}\,\hat{\Sigma}(x,y), \text{ and } \hat{\Sigma}$$

denotes the empirical covariance across the entire dataset. This choice of distribution is equivalent to reweighting the vectors $\tilde{f}$ so that each segment (feature and location) has unit norm on average.

In some embodiments, a number of random projections is sampled. One of the projections that optimizes a task-specific objective function is selected. For example, the projection that optimizes the average cell diameter is chosen. A dictionary of $W = \{w^{(1)} \ldots w^{(k)}\}$ is chosen ahead of time. At each node v, $w_v$ is set to be a random element of W. Thus, the index of $w_v$ is stored in W. For large face databases, further computational gains may be realized via an inverted file structure in which each leaf of the forest contains the indices of a list of training images such as images 110 for which the corresponding histogram bin is nonempty.

The expansion of the features by x,y ensures that the quantization remains as discriminative as possible while also maintaining robustness to local deformations. Because the quantizer acts in the joint space (f, x, y), it captures both deformations in feature value and image domain to generate a set of linear decision boundaries in this space.

FIG. 5 visualizes the quantization regions in an image of an eye 502 in the following manner: a feature descriptor f is extracted near the corner of the eye 502 at a point x, y. This descriptor is translated to every point x', y' on the image plane. The intensity of the shading on the image indicates the number of trees in the forest for which (f x, y) and (f', x', y') are implicitly matched. As shown in FIG. 5, the strongest implicit matches are near the corner of the eye 502 space and also correspond in feature value to patches sampled near eye 502 corners. Aggregating multiple trees creates a smoothing of the region boundary that better fits the structure of the data.

EXAMPLES

An example of a recognition distance metric is next described. In this example, each gallery and face image is represented by a histogram h whose entries correspond to leaves in $T_1 \ldots T_k$. The entry of h corresponding to a leaf L in $T_i$ simply counts the number of features f of the image for which $T_i(f) = L$. Each feature f contributes to k bins of h. Aspects of the disclosure are operable with many possible norms or distance measures for comparing histograms 114. Some embodiments use a weighted $l^1$ norm with weightings corresponding to the inverse document frequencies. More formally, if $X = \{X_i\}$ is the set of all the training faces and $h_i$ is the quantization histogram of $X_i$, the following Equation (4) applies.

$$d(h_1, h_2) \doteq \sum_j w_j |h_1(j) - h_2(j)| \quad (4)$$

$$w_j \doteq \log \frac{|X|}{|\{X_m : h_m(j) \ne 0\}|}$$

where $|\cdot|$ denotes the cardinality of the corresponding set. For this IDF weighting, quantization bins whose values appear in many face images are down-weighted because they are less discriminative. This matching scheme has the ability to scale to a large face dataset.

In some embodiments of the disclosure, the recognition rate tends to increase as the height of the forest increases. For transferring between databases, recognition performance can be improved by considering the top L levels of the tree (e.g., L=10). The top L levels of the tree adapt to structures that are common to all human faces, while the remaining lower levels fit much more specific aspects of the training database.

Further, increasing the number of trees improves or at least does not decrease recognition performance at least partially because aggregating the spatial boundaries of the bins produces a shape that is much more tightly tuned to the type of patch being quantized (e.g., eye corners). In some embodiments, removing the self-quotient normalization step reduces the recognition rate.

In the following examples, the operations described herein are performed on images including a subset of the Carnegie Mellon University (CMU) Pose, Illumination, and Expression (PIE) database. The subset contains 11,554 images of 68 subjects under varying poses (views C05, C07, C09, C27, and C29). The face recognition rate varies with different datasets.

Four distance metrics between histograms are considered, corresponding to the $l^1$ and $l^2$ norms, with and without IDF weighting. Table 1 gives the recognition rate in this scenario. In this example, the IDF-weighted versions of the norms always slightly outperform the unweighted versions, and $l^1$ is better than $l^2$.

TABLE 1

Recognition rate for various classifier norms.

| Norm | Rec. rate |
| --- | --- |
| $l^2$ unweighted | 86.3% |
| $l^2$ IDF-weighted | 86.7% |
| $l^1$ unweighted | 89.3% |
| $l^1$ IDF-weighted | 89.4% |

The appropriate tree height h for recognition is considered. The IDF-weighted $l^1$ norm is used as the histogram distance measure. A single randomized tree is induced. The effect of binning at different levels of the tree is compared. If the misclassification error is plotted as a function of height, the error initially decreases monotonically, with a fairly large stable region from heights 8 to 18, in some embodiments. The minimum error, 9.2%, occurs at h=16 in such embodiments.

The height h is fixed and the number of trees in the forest is varied, from k=1 to k=15. Table 2 below gives the recognition rates for this range of k. While performance is already good (89.4%) with k=1, it improves with increasing k, due to the smoothing effect. In some embodiments, k is fixed to equal 10 to keep the online computation time less than one second per image.

TABLE 2

Recognition rate vs number of trees.

| | Forest size | | | |
|---|---|---|---|---|
| | 1 | 5 | 10 | 15 |
| Rec. rate | 89.4% | 92.4% | 93.1% | 93.6% |

In some embodiments, to reduce the risk of overfitting each individual dataset, the tree parameters are fixed as follows: the number of trees in the forest is k=10, recognition is performed at depth 16, and the IDF-weighted $l^1$ distance between histograms is used.

The exemplary operations described herein are performed on a number of public datasets. The first, the Olivetti Research, Ltd. (ORL) database, contains 400 images of 40 subjects, taken with varying pose and expression. The database is randomly split into 20 subjects for training and 20 for testing. The next, the Extended Yale B database, mostly tests illumination robustness of face recognition algorithms. This dataset contains 38 subjects, with 64 frontal images per subject take with strong directional illuminations. The CMU PIE is also tested. The challenging Multi-PIE database is also tested. This dataset includes images of 337 subjects at a number of controlled poses, illuminations, and expressions, taken over 4 sessions. Of these, a subset of 250 subjects present in Session 1 is selected. Images from all expressions, poses 04_1, 05_0, 05_1, 13_0, 14_0, and illuminations 4,8,10 are selected. The Session 1 images are used as training, and Sessions 2-4 as testing. The detection and geometric rectification stages of embodiments of the disclosure are applied to all 30,054 images in this set. The rectified images are used as input both to the remainder of the system and to the other standard algorithms compared against.

To facilitate comparison against standard baselines, for the first three datasets standard, rectified versions are used. For MultiPIE, no such rectification is available. Here, instead, the full system from face and eye detection to classification is run. For comparison purposes, the output of the geometric normalization is fed into each algorithm. In addition to being far more extensive than the other datasets considered, MultiPIE provides a more realistic setting for the example system, in which it must cope with real misalignment due to imprecise face and eye localization. Table 3 presents the result of executing the operations in embodiments of the disclosure, as well as several standard baselines (PCA, LDA, LPP), based on linear projection.

TABLE 3

Recognition rates across various datasets.

| | ORL | Ext. Yale B | PIE | MultiPIE |
|---|---|---|---|---|
| PCA | 88.1% | 65.4% | 62.1% | 32.6% |
| LDA | 93.9% | 81.3% | 89.1% | 37.0% |
| LPP | 93.7% | 86.4% | 89.2% | 21.9% |
| This work | 96.5% | 91.4% | 94.3% | 67.6% |

In these examples, embodiments of the disclosure significantly outperform each of these baseline algorithms. Moreover, the performance approaches the best reported on these splits (e.g., 97.0% for ORL and 94.6% for PIE, both with orthogonal rank one projections, and 94.3% for Ext. Yale B with orthogonal LPP). For the newer MultiPIE dataset, the system performs over twice as well as baseline algorithms.

The Labeled Faces in the Wild (LFW) database contains 13,233 uncontrolled images of 5,749 public figures collected from the Internet. Here, rather than recognition, the goal is to determine if a given pair of test faces belong to the same subject. The nearest-histogram classification operation is omitted, and the method simply records the IDF-weighted $l^1$ distance between each pair of test histograms. Different thresholds on this distance give different tradeoffs between true positive rate and false positive rate. In this example, the method of the present disclosure achieves an equal error rate of 32%. This significantly surpasses baseline algorithms. Further, in aspects of the disclosure, there is weak dependence on the training data. In particular, similar performance may be obtained using randomized trees trained on completely different datasets. The PIE database is used as training and the LFW as testing. In this example, the equal error rate decreases to 28%, the ROC strictly dominates that generated by training on the LFW data itself.

Using a weakly supervised or even random classification scheme provides some protection against overfitting. Some embodiments train on one dataset and then test on completely different datasets. The recognition rates for several combinations of training and test database are shown in Table 4. Comparing to Table 3, the performance of embodiments of the disclosure decrease less than 5% when trained and tested on completely different datasets. The performance of PCA degrades similarly, but remains substantially lower. The performance of more complicated, supervised algorithms such as linear discriminant analysis (LDA) and locality preserving projection (LPP) drops much more significantly. For example, when trained on ORL and tested on ORL, LDA achieves a 94% recognition rate, which drops to 58% when trained on PIE and tested on ORL.

TABLE 4

Recognition rates for transfer across datasets.

| | PIE → ORL | ORL → PIE | PIE → MultiPIE |
|---|---|---|---|
| PCA | 85.0% | 55.7% | 26.5% |
| LDA | 58.5% | 72.8% | 8.5% |
| LPP | 17.0% | 69.1% | 17.1% |
| This work | 92.5% | 89.7% | 67.2% |

Other embodiments are contemplated. For example, if the number of training examples per subject is large, rather than retaining one histogram per subject a single histogram per class may be retained. Performance degrades only moderately, for example, reducing performance on the ORL database from 96.5% to 92.5%.

Aspects of the disclosure also contemplate other classifiers besides nearest neighbor for the histogram matching. For example, a support vector machine classifier in the histogram space may be used, or linear classifiers such as LDA or supervised LPP are applied to the histogram to effectively treat the quantization process as a feature extraction step.

Exemplary Operating Environment

While aspects of the invention are described with reference to the computing device 104, embodiments of the invention are operable with any computing device. For example, aspects of the invention are operable with devices such as personal computers, laptop computers, gaming consoles (including handheld gaming consoles), hand-held or vehicle-mounted navigation devices, portable music players, a personal digital assistant, an information appliance, a personal communicator, a handheld television, a small notebook computer, or any other type of electronic device.

By way of example and not limitation, computer readable media comprise computer storage media and communication media. Computer storage media store information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

Although described in connection with an exemplary computing system environment, embodiments of the invention are operational with numerous other general purpose or special purpose computing system environments or configurations. Examples of well known computing systems, environments, and/or configurations that may be suitable for use with aspects of the invention include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention transform a general-purpose computer into a special-purpose computing device when configured to execute the instructions described herein.

The embodiments illustrated and described herein as well as embodiments not specifically described herein but within the scope of aspects of the invention constitute exemplary means for constraining quantization regions in feature space and image space, and exemplary means for implicit elastic matching with random projections for pose-variant face recognition.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

APPENDIX A

Listed below is an example method for generating randomized projection trees. The projection trees are used for feature quantization such as illustrated in FIG. 3.

```
1:  Input: Augmented features X = {f̂₁...f̂ₘ},
    f̂ᵢ = (fᵢ,xᵢ,yᵢ) ∈ ℝ^(D+2).
2:  Compute feature and coordinate variances σ_f² and σ_x².
3:  Generate p ≥ D + 2 random projections
        W ~_iid N(0, diag(σ_f^(-2)...σ_f^(-2),σ_x^(-2),σ_x^(-2))).
4:  repeat k times
5:     Sample i ~ uni({1...p}).
6:     τᵢ ← median{⟨wᵢ, f̂⟩ | f ∈ X}
7:     X_L ← {f̂ | ⟨wᵢ, f̂⟩ < τᵢ}, X_R ← X \ X_L.
8:     rᵢ ← |X_L| diamter²(X_L) + |X_R| diameter²(X_R)
9:  end
10: Select the (w*,τ*) with minimal r.
11: root(T) ← (w*,τ*).
12: X_L ← {f̂ | ⟨w*, f̂⟩ < τ*}, X_R ← X \ X_L.
13: leftchild(T) ← rptree(X_L)
14: rightchild(T) ← rptree(X_R)
15: Output: T.
```

What is claimed is:

1. A system for representing face images to account for pose variations during the comparison of the face images, said system comprising:
   a memory storing at least a face image; and
   a processor programmed to:
      access the face image stored in the memory;
      sample the accessed face image to generate vectors corresponding to features of the accessed face image;
      expand each of the generated vectors by a spatial location corresponding thereto in the accessed face image by concatenating pixel coordinates onto the features, the concatenation increasing a dimension of the features by at least two dimensions corresponding to the concatenated pixel coordinates;
      quantize each of the expanded vectors based on one or more randomized decision trees to enable implicit matching between one or more of the features, the implicit matching occurring due to quantizing each of the expanded vectors resulting from the concatenation, quantization of each of the expanded vectors capturing both deformations in feature value and image domain to generate a set of linear decision boundaries;
      calculate a histogram of the quantized expanded vectors to represent the accessed image; and
      associate the calculated histogram with the face image in the memory.

2. The system of claim 1, wherein the memory stores a plurality of histograms associated with a plurality of face images and the processor is further programmed to compare the calculated histogram to one or more of the plurality of histograms stored in the memory to identify similarity between the face image and other face images.

3. The system of claim 1, wherein loose spatial information is incorporated into subsequent feature quantization by concatenating pixel coordinates of a center of a patch onto the corresponding feature, the patch being generated from the face image by performing dense sampling of the face image at a pre-defined pixel interval.

4. The system of claim 1, further comprising means for constraining quantization regions in feature space and image space.

5. The system of claim 1, further comprising means for implicit elastic matching with random projections for pose-variant face recognition.

6. A method for representing an image of a face, said method comprising:
 accessing an image;
 extracting a plurality of features from the accessed image;
 expanding each of the plurality of extracted features with coordinates of a location corresponding thereto in the accessed image by concatenating the coordinates onto the extracted features, the concatenation increasing a dimension of the extracted features by at least two dimensions corresponding to the coordinates;
 quantizing each of the expanded features based on one or more randomized decision trees to enable implicit matching between one or more of the plurality of extracted features, the implicit matching occurring due to quantizing each of the features expanded by the concatenation of the coordinates onto the extracted features; and
 calculating a histogram of the quantized expanded features to represent the accessed image.

7. The method of claim 6, further comprising:
 detecting a face within the accessed image;
 detecting a location of one or more eyes within the detected face;
 performing geometric rectification to map the detected locations to canonical locations; and
 performing illumination compensation on the geometrically rectified image, wherein said extracting the plurality of features comprises extracting the plurality of features from the compensated image.

8. The method of claim 6, wherein extracting a plurality of features from the accessed image comprises generating a plurality of patches from the accessed image by performing dense sampling at a pre-defined pixel interval.

9. The method of claim 8, wherein each of the extracted features having a predefined feature dimension of 400 and expanding each of the extracted features with coordinates of the location comprises concatenating pixel coordinates from the plurality of patches onto the plurality of features for a combined feature dimension of 402.

10. The method of claim 6, further comprising generating randomized projection trees.

11. The method of claim 6, further comprising combining spatially adjacent feature locations to reduce computational effort.

12. The method of claim 6, wherein quantizing each of the expanded features comprises quantizing each of the expanded features based on the one or more randomized decision trees to smooth region boundaries, the randomized decision trees being weakly data-dependent due to quantization of the features expanded by the concatenation of the coordinates onto the extracted features.

13. The method of claim 6, wherein extracting the plurality of features from the accessed image comprises extracting a plurality of high dimensional, near invariant features from the accessed image.

14. One or more computer-readable storage devices storing computer-executable components for comparing face images, said components comprising:
 a multiscale component that when executed by at least one processor causes the at least one processor to create a set of feature patches from an image of a face, said multiscale component further extracting a plurality of feature descriptors at a pre-defined pixel interval from the created set of feature patches;
 a match component that when executed by at least one processor causes the at least one processor to expand each of the features extracted by the multiscale component with coordinates of a location corresponding thereto in the image by concatenating the coordinates onto the features, said coordinates corresponding to the location from which each of the features are extracted, the concatenation increasing a dimension of the features by at least two dimensions corresponding to the coordinates, said match component further quantizing each of the expanded features based on one or more randomized decision trees to enable implicit matching, the implicit matching occurring due to jointly quantizing the features and the concatenated coordinates; and
 a similarity component that when executed by at least one processor causes the at least one processor to compare the quantized features corresponding to the image with quantized features corresponding to another image to generate a distance metric, said generated distance metric representing a difference between the image and the another image.

15. The computer-readable storage devices of claim 14, further comprising an interface component for providing, to a user, data corresponding to the distance metric generated by the similarity component.

16. The computer-readable storage devices of claim 15, wherein the similarity component calculates a confidence score based on the distance metric, and wherein the interface component provides the confidence score to the user.

17. The computer-readable storage devices of claim 14, wherein the similarity component further compares the quantized features corresponding to the image with quantized features from a plurality of other images to identify one or more of the plurality of other images with similar faces.

18. The computer-readable storage devices of claim 14, wherein the match component calculates a histogram of the quantized expanded features, said calculated histogram representing the image.

19. The computer-readable storage devices of claim 14, wherein the similarity component further weights the difference between the image and the another image based on discriminative features.

20. The computer-readable storage devices of claim 14, wherein the similarity component weights the difference using a term frequency-inverse document frequency weighting norm.

* * * * *